United States Patent [19]

Anderson

[11] Patent Number: 5,069,357
[45] Date of Patent: Dec. 3, 1991

[54] PANEL FOR ANIMAL TRUCK VENTILATION PORTS

[76] Inventor: Jack R. Anderson, P.O. Box 335, Darlington, Ind. 47940

[21] Appl. No.: 553,241

[22] Filed: Jul. 16, 1990

[51] Int. Cl.⁵ .................................................. B65D 39/00
[52] U.S. Cl. ...................................... 220/307; 220/242
[58] Field of Search ........................ 220/241, 242, 307

[56] References Cited

U.S. PATENT DOCUMENTS

| | | |
|---|---|---|
| 130,287 | 8/1872 | Dunbar . |
| 206,840 | 8/1878 | Sproat . |
| 234,420 | 11/1880 | Neracher . |
| 380,725 | 8/1888 | Langguth . |
| 388,671 | 8/1888 | Hager . |
| 474,998 | 5/1892 | Perkins . |
| 510,416 | 12/1893 | Fenton . |
| 577,871 | 3/1897 | Mather . |
| 657,743 | 9/1900 | Miller . |
| 970,806 | 9/1910 | Faget . |
| 998,082 | 7/1911 | Faget . |
| 1,110,447 | 9/1914 | Lindsey . |
| 1,196,832 | 9/1916 | Yuille . |
| 1,342,092 | 6/1920 | Campbell . |
| 1,349,747 | 8/1920 | Ackermann . |
| 1,857,681 | 5/1932 | Wine . |
| 2,570,324 | 10/1951 | Coyner ....................................... 98/6 |
| 3,015,408 | 1/1962 | Campbell et al. ............... 220/307 X |
| 3,438,536 | 4/1969 | Tarchalski ........................... 220/242 |
| 4,092,044 | 5/1978 | Hoffman ................................ 298/27 |
| 4,144,820 | 3/1979 | Jackle ................................. 105/368 D |
| 4,363,420 | 12/1982 | Andrews ............................... 220/307 |
| 4,470,231 | 9/1984 | Lewis ...................................... 52/204 |
| 4,534,086 | 8/1985 | Ricke ................................. 220/307 X |
| 4,537,119 | 8/1985 | Jarnot ...................................... 98/52 |
| 4,560,083 | 12/1985 | Danico .................................. 220/307 |
| 4,761,319 | 8/1988 | Kraus et al. .................... 220/307 X |
| 4,784,285 | 11/1988 | Patel ..................................... 220/307 |
| 4,883,194 | 11/1989 | Fernandes .......................... 220/307 |
| 4,896,590 | 1/1990 | Groos ...................................... 98/6 |
| 4,938,378 | 7/1990 | Kraus .................................. 220/307 |

FOREIGN PATENT DOCUMENTS 4360 of 1905 United Kingdom .
2046710 11/1980 United Kingdom .

*Primary Examiner*—Steven M. Pollard
*Attorney, Agent, or Firm*—Robert A. Spray

[57] ABSTRACT

Panel members for plugging the ventilation ports of animal-carrying vehicles. Locking tabs on the panel-periphery are sufficiently resiliently flexible as to be easily pushed across the edge of the truck's ventilation port, making installation easy for winterizing the truck by covering the truck's wall ports; and the resilient flexibility of the tabs permits an easy summerizing of the truck by being easily knocked out to re-open the wall ports. The resilient flexibility of the tabs permits repetitive use.

6 Claims, 1 Drawing Sheet

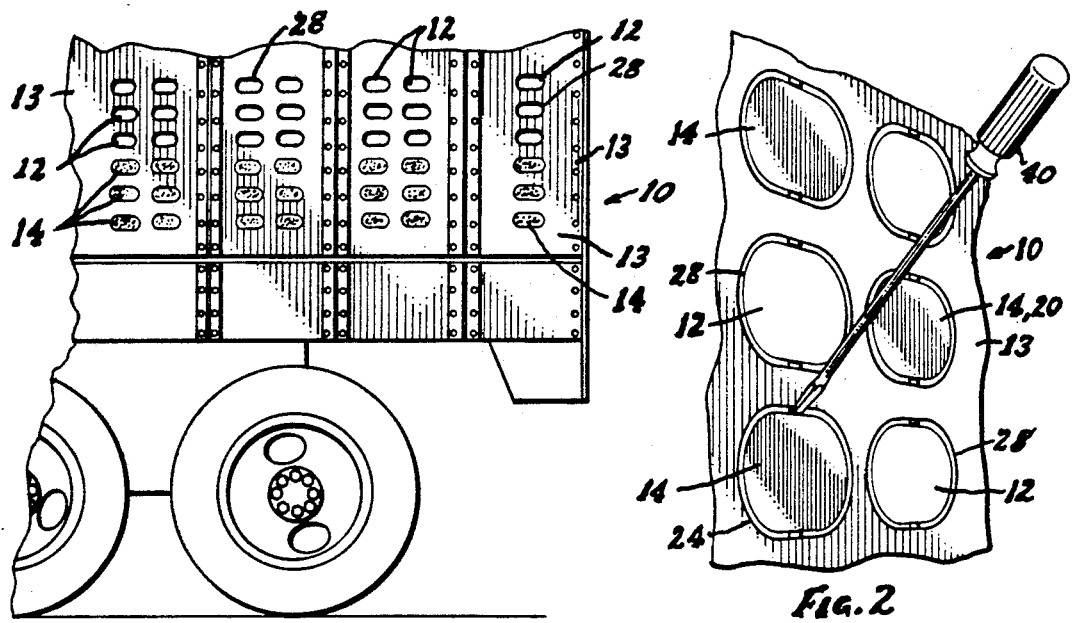
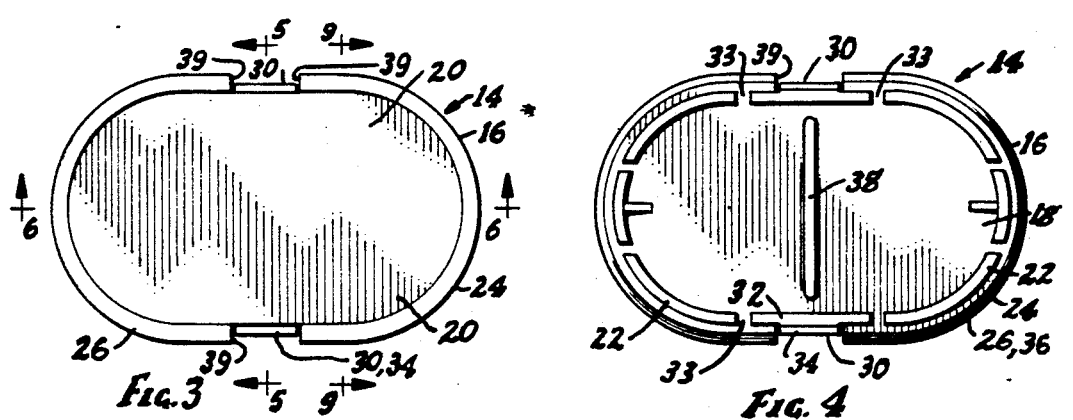
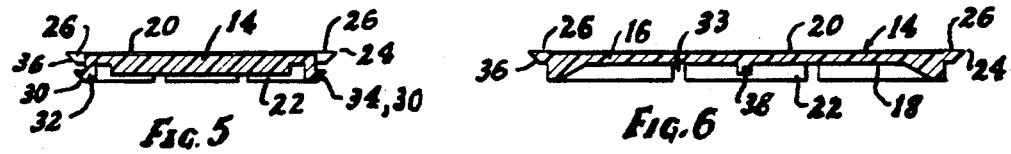
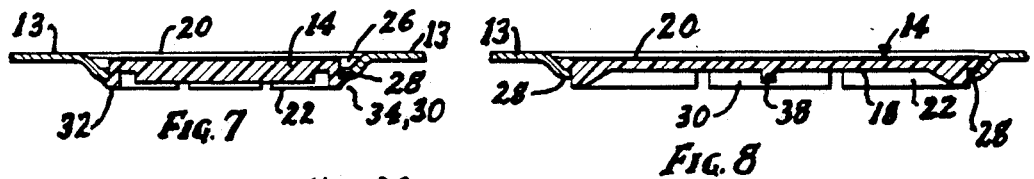
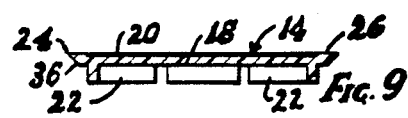

PANEL FOR ANIMAL TRUCK VENTILATION PORTS

FIELD OF THE INVENTION

The present invention relates to vehicles used for transport of animals; and more particularly, this invention relates to the provision of means for removably covering the multitude of ventilation openings provided in the walls of the animal truck or trailer during cold weather operations.

The ventilation openings in such vehicles are purposely made small, for minimizing the likelihood that the animals will injure themselves or others; and thus, for adequate ventilation and summer comfort, there are typically many (many more than a hundred) openings or ports in each of the animal-hauling vehicles. This great multitude of openings causes a special need for winterizing covers which are of great ease of installation and removal, as well as sturdiness, tightness, etc.

All of these desired characteristics and others, are achieved by panels of the present invention.

II. THE INVENTION, SUMMARIZED

The invention in a preferred form provides a novel closure-panel, made as a one-piece sheet-like body members having a peripheral rib which provides both a locater and a stiffener, a peripheral flange which provides an effective seal which overlies the edge of the vehicle's ports, and a movable locking tab or abutment.

All of these features and characteristics, providing a easy or "snap-in" installation and an easy or "knock-out" removal for repetitive and economical re-use, are achieved by a unitary plastic body as shown in the drawings and as detailed herein.

III. THE PRIOR ART DOES NOT SHOW THE INVENTIVE CONCEPTS

The prior art as to removable wall-port closure panels for animal-carrying vehicles is not known to the present inventor, except that he has come upon a round closure panel marked with the name of Niagara Plastics Co.

However, that cover panel does not have discrete locking tabs but instead has a peripherally-continuous shoulder on one side, and on the other side a peripherally-continuous flexible bevelled flange. Thus, although the shoulder and flange are concentric, and probably when once engaged around the edges of a wall-port would provide a port-blockage effect, installation and removal seem more difficult than with the present invention whose discrete tabs as locking details provide not only snug retention but ease of installation and removal.

And of course discrete locking tabs have been long known and long used for other things, such as for releasable closures of a lid of a container, etc. However, the present inventor does not know of any such feature for port-covers of the wall of an animal truck, even though the great number and small size of wall-ports for animal trucks makes a very advantageous utility of the closure panels of the present invention.

With this background, the significance of the combination of concepts of the present invention is to be considered by taking such factors into realistic consideration; i.e., the great utility need of wall-port closure panels for animal trucks, the long knowledge and use of many types of opening-closure panels, and of fasteners of various types including snap-type closures which are easily installed yet easily removed in various types of devices, the panels' mechanical simplicity, their openness to observation, their easy understandability by all persons, etc., which surely all combine to indicate that creativity of significantly novel articles in this field has been in fact non-obvious to untold numbers of persons for many years of need.

The non-creativity as to easily used closure panels for the ventilation ports of animal trucks, by the use of discrete locking tabs, emphasizes the lack of the world's creativity to the improvements here conceived, for which a patent award is deserved.

In a hindsight consideration of the present invention's concepts to determine its inventive and novel nature of the invention as a whole, it is not only conceded but emphasized that the prior art had details of panel-closures, and with discrete tabs in other uses, which would have been usable in this invention, but only if the prior art had had the guidance of the present concepts of the present invention.

The prior art has or should have long had much motivation as to concepts contributing to the present invention.

With the reality of all these factors, the inventive non-obviousness of the present invention is quite manifest.

Although varieties of prior art are conceded, and ample motivation is shown, and full capability in the prior art is conceded, no prior art shows or suggests details of the overall combinations of the present invention, as is the proper and accepted way of considering the inventiveness nature of the concepts.

Accordingly, the various concepts and components are conceded and emphasized to have been widely known in the prior art as to various devices; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

IV. BRIEF DESCRIPTION OF THE DRAWINGS

The above description of the novel and advantageous invention is of somewhat introductory and generalized form. More particular details, concepts, and features are set forth in the following and more detailed description of an illustrative embodiment, reference being had to the accompanying generally diagrammatic and schematic drawings, in which:

FIG. 1 is a fragmental detail view of a rear portion of an animal-carrying vehicle, as viewed from inside the vehicle, having a multitude of small ventilation openings or ports, the bottom three rows of ports having installed in each of them a removable closure panel of the present invention, but the three upper rows not yet so provided;

FIG. 2 is a pictorial view, in larger scale, also as seen from the vehicle's interior, showing three of this invention's port-covering panels as installed, and three of the vehicle's wall-ports not having a closure panel, and illustrating a recommended installation step with an associated screwdriver used as a tool for that step;

FIG. 3 is an elevation view of one of the closure panels of the present invention, showing the side-face thereof which would be inwardly-facing when the panel would be installed in a vehicle;

FIG. 4 is an elevation view of the other sideface of the panel, i.e., the sideface facing outwardly when the panel is installed;

FIG. 5 is a cross-sectional view, generally as taken by Section-line 5—5 of FIG. 3;

FIG. 6 is a cross-sectional view, generally as taken by Section-line 6—6 of FIG. 3;

FIG. 7 is a cross-sectional view like FIG. 5, except also showing a fragmental view of the vehicle's wall in whose ventilation opening a closure panel of the present invention is installed;

FIG. 8 is a cross-sectional view like FIG. 6, except also showing a fragmental view of the vehicle's wall in whose ventilation opening a closure panel of the present invention is installed; and FIG. 9 is a cross-sectional view, generally as taken by Section line 9—9 of FIG. 3.

V. DETAILED DESCRIPTION OF ILLUSTRATIVE EMBODIMENT

As shown in the drawings, the concepts provide a closure panel 10 for helping to meet the opposing hot-weather and cold-weather needs for vehicles 10 used for transport of animals.

For the hot-weather ventilation needs, animal hauling trucks and trailers (10) have been provided with a multitude of ports 12 to provide cooling of the animals; and for maximal retention of the animals, the ports 12 are relatively small, thus making particularly desirable the convenience and easiness of any closure for the great magnitude of the ports 12 provided for the transport vehicles 10, both as to their installation and removal.

Thus, the invention provides advantageous means, for the ventilation ports 12 of a wall 13 of an animal-carrying vehicle 10, a novel closure panel 14, with concepts, details, and features as described herein.

As shown, the panel 14 is provided as a sheetlike body member 16; and for purposes of description of the panels 14, their sidefaces are herein described as a first sideface 18, which when the body member 16 is installed on the vehicle wall 13 faces outwardly, referred to as a first direction transversely of the vehicle wall 13, and a second sideface 20, which is the face when the body member 16 is installed on the vehicle wall 13, faces inwardly, referred to as a second direction transversely of the vehicle wall 13.

As best shown in FIG. 4, the body member 16 has a peripheral rib 22 which extends from the first sideface 18 in the outward or first direction; and the peripheral rib 22 as shown is inwardly of the outer edge 24 of the body member 16. This provides that the edge portion 26 of the body member 16 which is between the rib 22 and the outer edge 24 of the body member 16 provides a peripheral flange 26.

It is to be noted that the peripheral rib 22 is of a size and shape to locate the body member 16 into operable registry with the wall port 12 as to be insertable in the port 13 in installation. The installation, as is further described herein, is a procedure done from inside the vehicle 10, in which the panel 14's body member 16 is pushed in the first direction (outwardly) into the vehicle's ventilation port 12.

This movement of the body member 16 causes the peripheral rib 22 to move to an installed position in which it has crossed past the wall port 12's edges 28; and the panel's peripheral flange 26 which extends between the peripheral rib 22 and the body member's edge 24, when the body member 16 is moved into installed position, overlies the wall port edges 28.

Again referring to FIG. 4, as shown opposite portions of the peripheral rib 22 are provided with an abutment tab or lug 30 extending outwardly from the rib 22 generally parallel to the body means 16, this extending an amount sufficient that at least one of the abutment lugs 30, prior to the said installation procedure, will not pass the adjacent portion of the wall port edge 28; but it is able to pass the adjacent portion of the wall port edge 28 by an installation procedure in which the user applies force to the abutment lug 30 sufficient to achieve resilient deformation of the abutment lug 30 and/or of the portion 32 of the peripheral rib 22 which is adjacent and thus carries the abutment tab or lug 30.

Then, the abutment lug 30, after being caused to pass the wall port edge 28, thus provides an abutment for retaining the body member 16 by blocking the body member 16 against movement of the body member in what is referred to herein as the second direction away from the wall port 12; and the peripherally extending flange 26 is retaining the body member 16 by blocking the body member 16 against movement of the body member 16 in what is referred to herein the first direction away from the wall port 12.

Desirably, the peripheral rib 22 is substantially circumferentially continuous.

However, the peripheral rib 22 is made discontinuous at locations 33 adjacent the rib portion 32 from which the abutment lug 30 extends, providing that the resilient deformation, needed to be imposed upon the peripheral rib 22 in the installation procedure, need be only that portion 32 of the peripheral rib 22 between the locations 33.

The abutment lug 30 is provided with a bevelled face 34 in its portion outwardly of the peripheral rib 22; and this facilitates the installation procedure in which the abutment lug 30 is being forced past the adjacent wall port edge 28.

Also, the peripheral flange 26 is provided with a bevel 36 along its outer edge 24 for accommodation of whatever is the nature of the vehicle's wall port edges 28.

The body member panel 14 is provided, on its first sideface 18, with a stiffener rib 38 extending between the abutment lugs 30, which provides transmission of panel-moving force applied to the stiffener rib 38 during removal of the body member 16 from the wall port 12.

The peripheral flange 26 is made to be discontinuous (39) in the region of the abutment lugs 30; and this accommodates the presence of a tool, shown in FIG. 2 as a screwdriver 40, to be applied directly against the abutment lug 30 in the installation procedure of forcing the abutment lug 30 into its panel-retaining position shown in FIGS. 7 and 8.

VI. INSTALLATION RECOMMENDATIONS AND REVIEW

Standing in the inside of the vehicle 10, facing the vehicle's wall 13 having ventilation ports 12 to cover, the installer is to hold one of the closure panels 14 with its sideface 18 having ribs 22 and locking tabs 30 facing outwardly, and insert the closure panel's bottom locking tab 30 in its place of retention, i.e., outwardly of the edge of the vehicle's wall panel 13 which has the ventilation opening or port 12.

Secondly, the installer then presses the lower portion of the panel 14 outwardly, i.e., against the vehicle wall 13; and slides his or her thumbs along the inner face 20 of the closure panel 14, all the while pushing outwardly against the panel 14, around the panel's ends and up and toward the panel's upper locking tab 30.

(At this stage of assembly much of the panel 14 will be in its place of retention along the vehicle wall 13, with much of the panel's peripheral rib 22 inwardly of the vehicle's wall opening 13 and in general registry with the vehicle's wall opening 13; and only the panel's upper locking tab 30 and the adjacent portion 32 of the panel's peripheral rib 22 will be still inwardly of the installed position of the panel.)

Next, although realizing the need now of applying an outward force to the panel 14 and/or to the upper locking lug or tab 30, in order to force the panel's upper locking tab 30 past the vehicle wall 13, the closeness of fit and the limited flexibility of the locking tab 30 require that one should not attempt to hammer the upper locking tab 30 into its place of retention on the vehicle wall 13.

Instead, as shown in FIG. 2, the installer should apply force directly onto the rib-portion 32 of the peripheral rib 22 which carries the upper locking tab or abutment 30, more against that rib-portion 32 than against the tab 30.

That is, instead of a hammering against the panel 14 or the upper locking tab 30, the installer should apply force downwardly onto that upper rib wall 32 as by one hand bumping the end of a wide blade screwdriver held by the installer's other hand; and this downward force will achieve a sufficient downward bending of that rib-portion 32 that the locking tab 30 will be moved downwardly enough to pass across the plane of the vehicle wall 13, and to then snap in its place of panel-retention due to the resilient deformation of the tab-carrying portion 32 of the panel's peripheral rib 22.

(In this procedure, although some force will be inevitably applied by the screwdriver directly against the upper locking tab 30, the yielding of the rib-portion 32, by the recommended application of a downward force onto that rib-portion, will be sufficient to bring the locking tab 30 into a lower place, enabling it to freely cross past the plane of the vehicle wall, without accidental damage of the locking tab 30.)

For removal of the cover panel 14, simply bump the center of the panel, from outside the vehicle, by use of a small rubber hammer or similar tool; the yieldability of the closure panel 14 about its longer axis, plus the effect of the beam-effect of the panel's vertical central rib 38 as carrying the inwardly directed hammer-blow force to the upper and lower central portions of the panel 14 which act as movable supports in their carry of the upper and lower locking tab 30 in a cantilever manner, co-operate to let the upper and lower locking tabs 30 to move sufficiently vertically as to move clear of the vehicle wall 13, thus releasing the cover panel 14 without damage, and thus be re-usable.

VII. CONCLUSION

It is thus seen that closure-panels for the ventilation openings of animal-carrying vehicles, as provided and used according to the inventive concepts herein set forth, provide novel concepts of a desirable and unitary device, having advantageous details and features, which, in overall combination, is conceptually different from the prior art articles even though various objects embodying certain of the details as a basic capability have been known for years; yet significantly this particular combination, even considered as including or building on prior art concepts, has not been suggested by the prior art, this achievement being a substantial and advantageous departure from prior art. And particularly is the overall difference from the prior art significant when the non-obviousness is viewed by a consideration of the subject matter as a whole, as integrally incorporating a combination of features as different from the prior art, in contrast to merely those details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantageous combination, not only being different from all the prior art known, but because the achievement is not what is or has been suggested to those of ordinary skill in the art, especially realistically considering this as comprising components which individually are similar in nature to what is well known to makers and users of various ventilation opening covers for many years. No prior art has suggested the modifications of any prior art to achieve the particular novel concepts here achieved for animal trucks, with the various features providing their own functions in the overall combination; and this is particularly significant since closure panels, to cover windows and other openings, are surely of an old an art as most others.

Accordingly, it will thus be seen from the foregoing description of the invention according to this illustrative embodiment, considered with the accompanying drawings, that the present invention provides new and useful concepts of a novel and advantageous combination providing a closure panel yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of components as are herein described or shown.

I claim:

1. A closure panel for releasably closing a ventilation port in a wall of an animal-carrying vehicle, the closure panel comprising:
    a sheetlike body member having a first sideface which when the body member is installed on the vehicle wall faces a first direction transversely of the vehicle wall, and a second sideface which when the body member is installed on the vehicle wall faces a second direction transversely of the vehicle wall;

the body member having a peripheral rib extending substantially continuously peripherally along and from the first sideface of the body member in the first direction; and the peripheral rib being inwardly of the outer edge of the body member, providing that the edge portion of the body member, between said rib and the outer edge of the body member, provides a peripheral flange;

the peripheral rib being of a size and shape to locate the body member into operable registry with the wall port as to be insertable therein, by installation procedure including movement of the body member in the first direction into the vehicle's ventilation port;

said movement of the body member causing the peripheral rib to move to an installed position in which it has crossed past the wall port edges;

the peripheral flange, extending between the peripheral rib and the body member's edge, being such that when the body member is moved into said installed position, the peripheral flange will overlie the wall port edges;

opposite portions along only a substantially small portion of the said peripheral rib being provided each with an abutment lug extending outwardly from the rib, generally parallel to the body means, an amount sufficient that at least one of the abutment lugs, prior to the said installation procedure, will not pass the adjacent portion of the wall port edge but it is able to pass the adjacent portion of the wall port edge by an installation procedure in which the user applies force to the said rib and/or abutment lug sufficient to achieve resilient deformation of the abutment lug and/or of the portion of the peripheral rib which is adjacent the abutment lug;

the abutment lug, after being thusly caused to pass the wall port edge, thus providing an abutment retaining the body member by blocking the body member against movement of the body member in the second direction away from the wall port, and the said peripherally extending flange is retaining the body member by blocking the body member against movement of the body member in the first direction away from the wall port;

in a combination in which the peripheral rib is made discontinuous at locations adjacent the rib portion from which the abutment lug extends, providing that the resilient deformation needed to be imposed upon the peripheral rib, in the installation procedure, need be only that of the peripheral rib between the said locations; and the combination being such that the peripheral flange is made to be discontinuous in the region of the abutment lugs, thus accommodating the presence of a tool to be applied directly against the abutment lug, and/or the adjacent portion of the peripheral rib which carries the abutment lug, in the installation procedure of forcing the abutment lug into its panel-retaining position.

2. The closure panel as set forth in claim 1, in which the peripheral rib is substantially circumferentially continuous.

3. The closure panel as set forth in claim 2, in which the peripheral flange is made to be discontinuous in the region of the abutment lugs, thus accommodating the presence of a tool to be applied directly against the abutment lug, and/or the adjacent portion of the peripheral rib which carries the abutment lug, in the installation procedure of forcing the abutment lug into its panel-retaining position.

4. The closure panel as set forth in claim 1, in which the peripheral flange is provided with a bevel along its outer edge, for accommodation of whatever is the nature of the vehicle's wall port edges.

5. The closure panel as set forth in claim 1, in which the body member is provided, on its said first sideface, with a stiffener rib extending between the said abutment lugs, and providing transmission of panel-moving force applied to the stiffener rib during removal of the body member from the wall port.

6. The closure panel as set forth in claim 1, in which the abutment lug is provided with a bevelled face in its portion outwardly of the peripheral rib, facilitating the installation procedure in which the abutment lug is being forced past the adjacent wall port edge.

* * * * *